Nov. 15, 1938. H. MOREAU 2,137,059
ELECTROMAGNETIC SYSTEM FOR THE AUTOMATIC REGULATION OF TEMPERATURES
Filed March 20, 1936 2 Sheets-Sheet 1

INVENTOR:
HENRI MOREAU
BY Haseltine Lake & Co.
ATTORNEYS

Nov. 15, 1938.  H. MOREAU  2,137,059
ELECTROMAGNETIC SYSTEM FOR THE AUTOMATIC REGULATION OF TEMPERATURES
Filed March 20, 1936   2 Sheets-Sheet 2
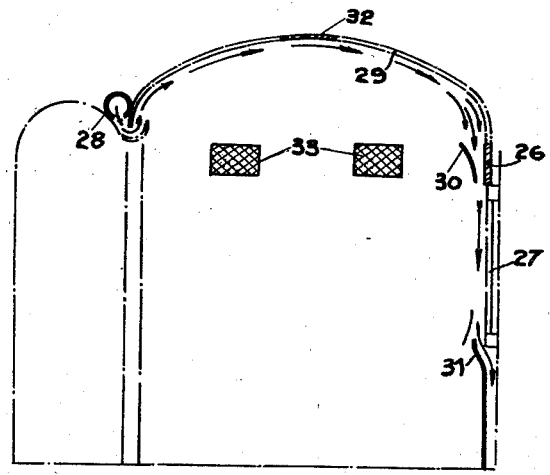
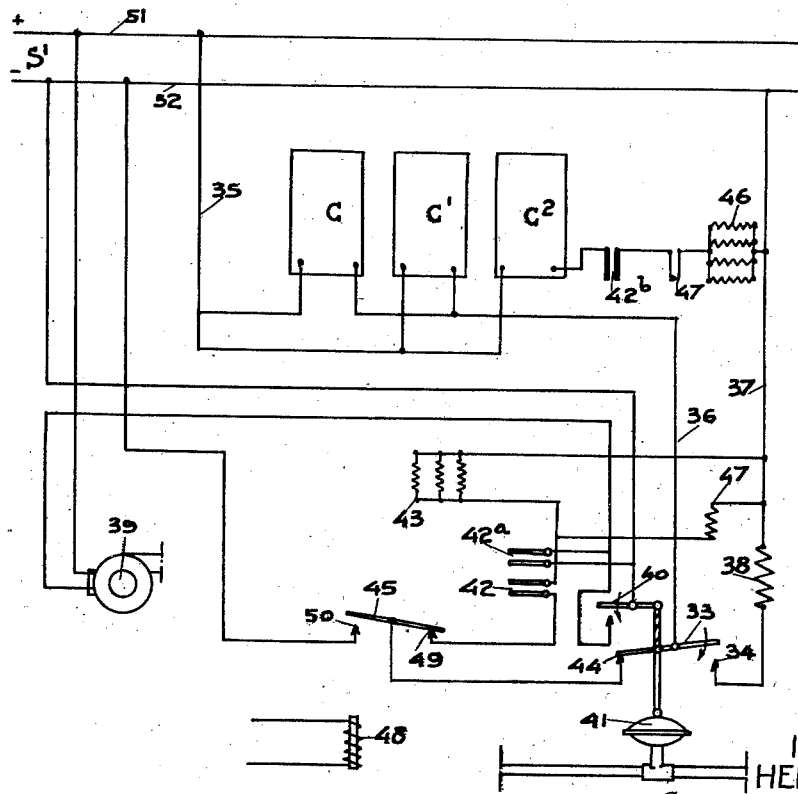
INVENTOR:
HENRI MOREAU
BY Haseltine, Lake & Co.
ATTORNEYS Patented Nov. 15, 1938

2,137,059

UNITED STATES PATENT OFFICE 2,137,059

ELECTROMAGNETIC SYSTEM FOR THE AUTOMATIC REGULATION OF TEMPERATURES

Henri Moreau, Paris, France

Application March 20, 1936, Serial No. 69,997
In France March 25, 1935

1 Claim. (Cl. 236—69)

This invention relates to the automatic regulation of temperatures by means of a galvanometer responsive to extremely reduced currents and the index of which acts as a contact for producing effects from which the automatic control of a source of heat takes place.

In systems of this kind, the energization of the galvanometer takes place in shunt at the apices of variable potential of a Wheatstone bridge having resistances variable in function of the temperature. These resistances are subjected to variable temperatures and are so adjusted that any unbalancing of the bridge, that is to say any difference of potential, in one direction or the other, produces, upon energization of the galvanometer, the closing of the contact of the index and determines the effects which are to restore balancing.

In systems of this type, use is made of mercury contacts or rockers, which present this advantage that they never become dirty but, on the other hand, have the inconvenience, particularly when the plant is exposed to vibrations, of maintaining the mercury in contact with the three terminals of the rocker. A so-called "ringing" phenomenon then occurs, the contacts receiving a periodical beating or pulsating movement which is indefinitely sustained.

The present invention, which particularly concerns the application of systems of the kind described to the automatic control of the heating of railway and like vehicles, exposed to vibrations, has for main object to remedy the above inconvenience. For that purpose, it particularly consists in connecting the mercury rockers to the Wheatstone bridge and to the winding of the galvanometer, in such a manner that, when the mercury accidentally touches the three contact pieces of a mercury rocket, the galvanometer is short-circuited, the index then remaining at zero during a very short time, which is without inconvenience.

This feature of the invention is obviously applicable to fixed installations, although the necessity of same is less imperative than for installations on land, nautical or aerial vehicles.

In its application to vehicles, and more particularly to railway vehicles, the invention relates to an arrangement and to a distribution of the resistances responsive to temperature which intervene in the regulation of the temperature within the compartments. This arrangement comprises a unit constituted by a resistance distributed on an insulating support, made of asbestos for instance, arranged between two metal plates having a good thermal conductibility, and made of aluminium for instance, with interposition of a suitable insulating material (mica or the like).

These resistances, connected in series, are distributed at the following places, when the invention is applied to the heating of compartments of railway vehicles by hot air passing on the inner face of the roof or deck, this hot air also circulating in front of the window openings.

One or more resistances are arranged on the roof or deck in order to be influenced by the temperature of the air and of the roof.

Resistances are arranged above the window openings in order to be influenced by the air cooled by contact with the roof.

Resistances are arranged in the compartments so as to cause to intervene, in the automatic control, the temperature of the atmosphere of the compartment.

Resistances are arranged outside the carriage for taking into consideration the external temperature and the speed of the carriage.

With the heating system above contemplated, and the resistances being distributed as just indicated, when a carriage is cold and when heating air begins to be admitted, the control is such that this air is admitted at a high temperature and immediately surrounds the travellers with a sheath which, by convection effect, gives the sensation of a hot atmosphere. In proportion as the hot air passes on the walls and particularly on the roof and heats them up, they radiate their calories on the occupants without appreciably heating up the atmosphere of the compartments. By the action of the control resistances, the heating by radiation progressively replaces that obtained upon starting by convection, and the air circulates at a more and more reduced temperature. The regulation can be such that, in period of operation, the radiation of the roof ensures heating in a relatively cool atmosphere, this giving real comfort for the occupants. The invention, particularly applied to the heating of railway vehicles, also includes various features which will appear from the following description with reference to the accompanying drawings, given by way of example only, and in which:

Fig. 2 is a diagrammatic cross section of a compartment of a railway carriage, and shows the location of the inner control resistances.

Fig. 3 is a diagram of a heating plant for a railway carriage.

Figure 1:
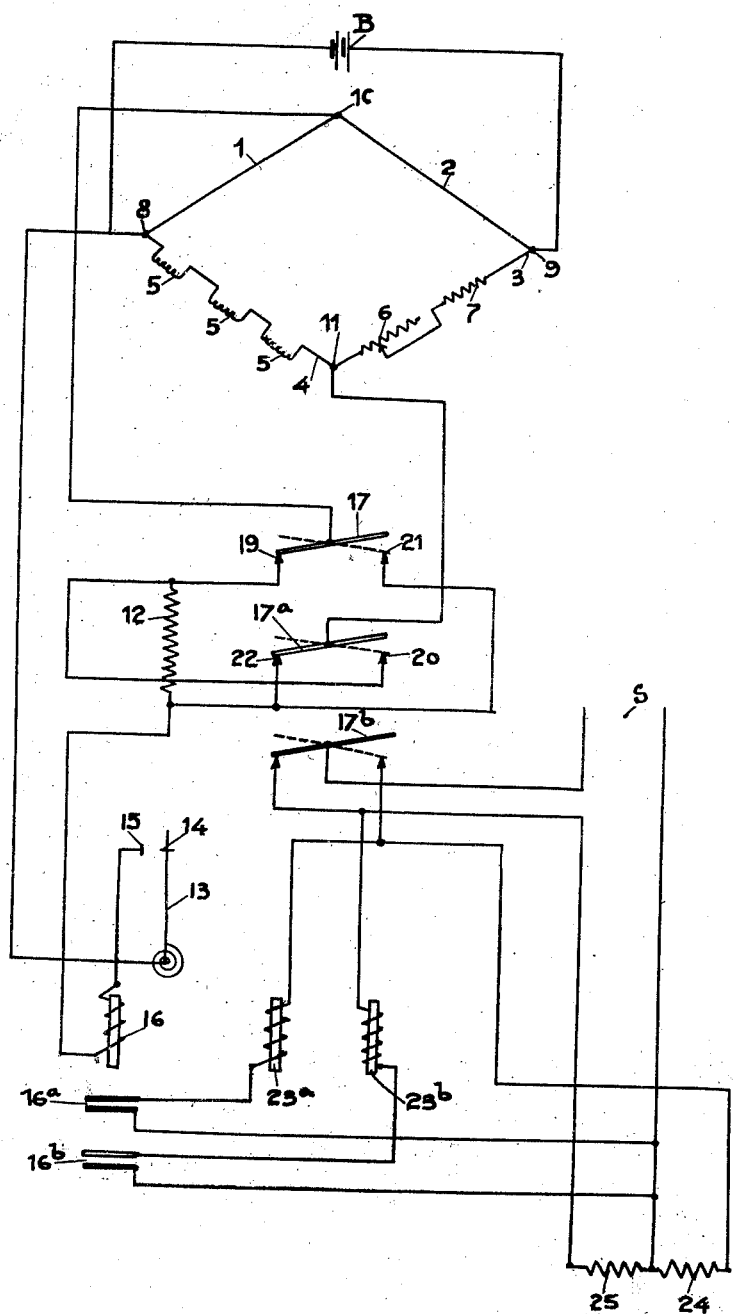
Fig. 1 is a diagram of a control system provided with mercury contacts arranged according to the invention for avoiding the "ringing" phenomenon.

In the system shown in Fig. 1, a Wheatstone bridge has branches 1, 2, 3, 4. On the branch 4 are provided resistances 5 variable with the temperature, and for instance the resistances above mentioned, all connected in series from one compartment to the other of a railway carriage. On branch 3 are arranged: a regulating resistance 6 and a compensating resistance 7 acting in the known manner for the determination of the regulating conditions upon starting.

The bridge is supplied, at the apices 8 and 9, with electric current of low voltage, 12 volts for instance. Across the apices 10 and 11 of variable potentials is arranged the winding or frame 12 of a galvanometer, the index 13 of which is provided, in the known manner, with a contact 14, which, when the winding 12 is energized, even to a very slight extent, comes in engagement with a contact 15 in series with a resistance 16.

The index 13 is permanently connected to the apex 8 of the bridge and, according to the invention, the two mercury rockers 17 and 17a, acting in combination for reversing the direction of energization of the frame 12 of the galvanometer when the index has come in engagement with the contact piece 15, are so arranged that the connection of their three contact pieces by accidental spreading out of the mercury, has simply for effect to short circuit frame 12. In the example illustrated:

The central contact piece of the rockers 17 and 17a is connected to the apices 10 and 11, respectively, of the bridge.

One of the end contact pieces 19 of the rocker 17 is connected to the opposite contact piece 20 of the rocker 17a.

The other end contact piece 21 of rocker 17 is connected to the opposite contact piece 22 of rocker 17a.

The frame 12 is connected to the two lines 19—20 and 21—22.

The resistance 16 is connected to the preceding circuits so that, according to the position of the rockers, it short-circuits branch 4 or branch 1 of the bridge. It forms the winding of an electromagnet the movable armatures of which are constituted by two working contacts 16a and 16b, the closing of which respectively switches in circuit, on a source S of current supply of 110 volts, electromagnets or relays 23a and 23b, through the medium of a mercury rocker 17b associated with the two rockers 17 and 17a. The source S can moreover also supply the bridge with current, this allowing, by means of suitable connections, to dispense with source B.

The operation of the installation is as follows:

The index 13 being at zero, it will be assumed that a variation of the resistance constituted by the entire set of resistances 5, in a direction corresponding to an excess of calories supplied by the heating source, unbalances the Wheatstone bridge. The energization of frame 12 causes contact 14 to engage with contact 15, and this, in the known manner in systems of the kind described, shunts the resistance or electromagnet 16 1 resistance 5 for accentuating the unbalancing of the bridge and ensuring a firm contact at 14—15.

The electromagnet 16 is energized by a circuit comprising: a pole of battery B supplying the bridge with current, branch 3 of the bridge, contact piece 22 of rocker 17a, electromagnet 16, contacts 15—14, index 13, and the other pole of battery B.

Contacts 16a and 16b are simultaneously closed. A circuit is closed through source S-110 volts, contact 16b, electromagnet 23b, rocker 17b, and source S. The energization of electromagnet 23b acts on the rockers 17, 17a, and for placing them in the position shown in broken lines in the drawings. This causes:

1. A reversal of the direction of energization of frame 12, which produces complete release of index 13, that is to say the opening of contact 14—15.

2. The switching on of relay 24 at the terminals of source S, this relay acting through any suitable intermediary for reducing the heating at the source.

When the resistance 5 varies in a direction corresponding to a deficiency of heating at the source, the unbalancing of the bridge is such that a current passes in frame 12 in the direction for moving contacts 14—15 towards each other. When this contact takes place, the engagement is accentuated owing to the fact that resistance 16 short-circuits branch 3 of the bridge. Contacts 16a and 16b are again closed and the rockers 17—17a and 17b are restored to the positions they occupy in the drawings by energization of relay 23a. The energization of relay 24 is cut off, and relay 25 is switched on at the terminals of source S in order to act in the direction for increasing the heating at the source.

It is to be noted that relay 16 might be dispensed with and that the energization of relays 23a and 23b might be directly controlled by the contact 14—15 of index 13.

This system is applicable whatever may be the source for heating the air. If this source is constituted by a heating exchanging apparatus fed by the steam supplied by the locomotive, the relays 24 and 25 act on a steam regulating gate valve, either by progressive regulation or by "on and off" regulation. If electric heating is resorted to, the relays 25 and 24 act on suitable rheostats. One and the same carriage can have two kinds of heating: electrical and steam heating. An example of this case is shown in the diagram of Fig. 3 and will be described later on.

As previously stated, the resistances 5 are all connected in series from one compartment to the other, on the branch 4 of the Wheatstone bridge. These resistances comprise, for the entire car:

A resistance arranged outside and at the front of the carriage. This resistance is effected by the external temperature and by the speed, or by the relative wind. In fact, it is slightly heated by the passage of the current and is cooled to a greater or less extent by the relative wind. For the same reason, it causes insulation to intervene in the regulation.

Resistances 26 (Fig. 2) arranged within each compartment, above the window openings 27. These resistances, constituted as above stated, cause to intervene, in the regulation, the temperature of the air which, being hot when it comes from the distributor 28, has swept the roof 29. This air, when it leaves the roof can be drawn into spaces delimited by screens 30 and 31 which, by Venturi effect, prevent its immediate diffusion in the atmosphere of the compartment.

Resistances 32 fitted into the roof and causing to intervene, in the regulation, both the temperature of said roof and the temperature of the air sweeping over the roof.

Resistances 33 distributed at places which are the most suitable to be influenced by the temperature of the atmosphere of the compartment.

A resistance placed in the hot air sheath or in the hot air supply distributor 28, in order to avoid that, in the case of external temperatures momentarily high and due to any cause whatever, the temperature of the air blown in does not lower below a too low value.

The entire set of the above resistances terminates in a resistance arranged outside the carriage and placed at the rear of the latter. This resistance becomes the resistance placed at the front when the direction of displacement of the carriage changes.

In the regulating or automatic control system described in the foregoing and in all those of the general type first set forth, use can be made, instead of a galvanometer having a single frame, of galvanometers of the "Logometer" type provided with crossed frames. In this case, one of the frames is connected in series with the entire set of the resistances variable with the temperature, and the other frame is connected in series with a regulating or compensating resistance. In this case, one frame is substituted for another and, at the time of contact, this substitution produces a reversal effect similar to those produced by the mercury rockers 17 and 17a.

Fig. 3 shows the general diagram of an installation for controlling the heating in a railway carriage intended to circulate on ordinary tracks and on electrified tracks. In this example, the heating sources used for the air blown into the compartments are: the steam supplied by the locomotive, electric resistances supplied with current by a battery charged by the current generator driven from one of the axles of the carriage, or again electric resistances supplied with current having a voltage of 1500 volts when the carriage circulates on an electrified track.

Three control systems, such as that described with reference to Fig. 1, are provided and shunted on the 64 volts battery arranged in the carriage.

The controller C acts for regulating the temperature of the air.

The controller $C_1$ acts for preventing the air blown in from falling below a definite value.

The controller $C_2$ controls the action of a battery of electric heating resistances arranged under the floors of the compartments of the carriage.

In winter, when steam supplied by the locomotive is available, a known apparatus, such as that known under the name of "Pressuretrol" for instance, and subjected to the pressure of the steam, acts on a contact 33—34 which switches on the controllers C and $C_1$ at the terminals of the 64 volts source S, through: positive pole of the source, line 35, controllers C, $C_1$, line 36, contacts 33—34, line 37, and negative pole of source $S_1$. An energized relay 38 acts for opening a steam inlet gate valve for the exchanger heating the air blown in by a fan 39. The supply circuit of the latter on source $S_1$ comprises, on the one hand, the contact 40 insulated from contact 33—34 and which closes and opens at the same time as contact 33—34 under the action of the apparatus 41 subjected to the steam pressure and, on the other hand, the working contact 42a which closes at the same time as contact 42 when the current generator is switched on. This contact 42 acts for switching on resistances 43 for heating the air blown in when, in summer time or between seasons, or when required or accidentally, no steam is admitted. In this case, contact 33—34 is opened as well as contact 40. But, as soon as the current generator is switched on, that is to say when the carriage starts, contacts 42 and 42a close. The fan 39 and the resistances 43 are switched on and this without risk of accidentally exhausting the battery of source $S_1$, since the latter is constantly recharged by the current generator.

In these conditions, the circuit feeding the resistances 43 closes through:

Positive pole of source S, controllers C and $C_1$, movable contact 45, contact 42, resistances 43 and negative pole of source $S_1$.

This circuit can be opened by controller C which acts in the conditions explained above. If, in case of sudden rise of the external temperature, or if the carriage is full of travellers, the controller C acted in such a manner that the temperature of the air blown in lowers below a certain value capable of giving to the occupants of the compartments a sensation of cold, the controller $C_1$, specially provided for that purpose, acts for maintaining the air above the minimum temperature considered as inadmissible. In that respect, the controller $C_1$ can be constituted by a simple thermostatic device which closes the circuit above mentioned for resistances 43, when this circuit having been opened by controller C, the temperature of the air blown in tends to lower below a value for which the thermostat is adjusted.

When heating is effected by steam, the contact being closed at 40, the motor of the fan 39 is normally supplied with current by source $S_1$. Under each compartment is moreover provided a series of heating resistances 46 which can be supplied with current by source $S_1$, under the control of a controller $C_1$ which can be constituted by a thermostatic device maintaining the temperature of the resistances 46 at 25 degrees for instance.

When the resistances 43 are in circuit, the relay 47 is energized and opens the rest contact 47a, so that the resistances 46 are no longer in action. But when the controller C acts, when the air need not be heated, for de-energizing the resistances 43, the relay 47 ceases to be energized; the rest contact 47a closes, and if the current generator is switched on, the working contact 42b, associated with 42a, closes, and the resistances 46 are supplied with current without risk of exhausting the battery or source $S_1$.

It will therefore be seen that the floor is heated only in the intervals of time during which the air blown in must not be heated, and this only when heating by steam is not effected (period between seasons or breakdown of the steam supply). A manual device can eventually allow of departing from the programme established for a period of time fixed beforehand and determined by a clockwork. The installation which has just been described is completed by a high voltage heating (1500 volts) for instance when the carriage forms a part of a train drawn by an electric motor coach on an electrified track. A connection then energizes the relay 48 which causes the movable contact 45 to rock. The contact 45—49 is opened, the contact 45—50 is closed and, through suitable transformers, the lines 51 and 52 are connected to the high voltage supply, the resistances 43 are switched off as well as the controller $C_2$ and the resistances 46. A series of special resistances for heating the air blown in by the fan 39, is then switched on under the control of controllers C and $C_1$, with the same effects as those already indicated, the contact 33—34 remaining closed, owing to the absence of pressure in the apparatus 41.

What I claim as my invention and desire to secure by Letters Patent is:

In an automatic hot air heating plant for railway vehicles, the combination, with a Wheatstone bridge system for automatically controlling the temperature of the heating air and including means for heating the air, of a contact galvanometer connected to the Wheatstone bridge, two mercury switches for controlling the circuit of the winding of the galvanometer, each of the middle terminals of the said switches being connected to one of the variable potential apices of said bridge, while the other terminals are connected together from one switch to the other and with the galvanometer-circuit in order to short-circuit the latter when mercury accidentally connects the three terminals of one of said switches, and a series of variable resistances responsive to temperature changes and constituting one branch of the Wheatstone bridge, the resistances in said series being respectively exposed to the temperature of the heating air when entering beneath the ceiling of the vehicle to the temperature of air flowing under the ceiling, to the predetermined ceiling temperature, to the temperature of cooled air after leaving the ceiling, to the temperature of the general atmosphere of the vehicle, to the temperature of the air exterior to the vehicle, and to the cooling effect of the relative wind of the vehicle due to its motion during travel.

HENRI MOREAU.